J. P. FISHER.
APPARATUS FOR REMOVING SUSPENDED MATTER FROM GASES.
APPLICATION FILED AUG. 29, 1919.
1,420,986.
Patented June 27, 1922.
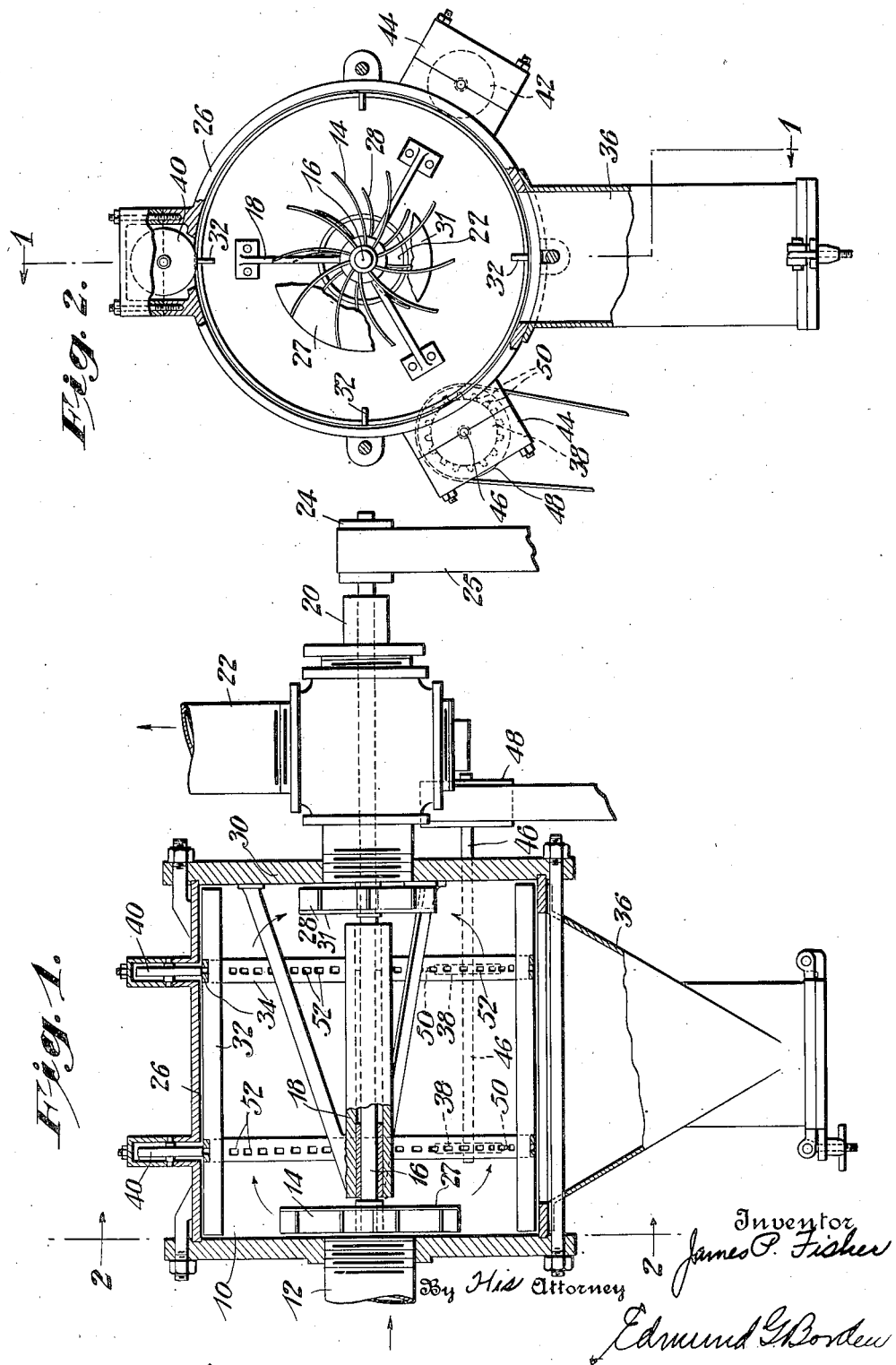

UNITED STATES PATENT OFFICE.

JAMES P. FISHER, OF BARTLESVILLE, OKLAHOMA, ASSIGNOR, BY MESNE ASSIGNMENTS, TO DOHERTY RESEARCH COMPANY, OF NEW YORK, N. Y., A CORPORATION OF DELAWARE.

APPARATUS FOR REMOVING SUSPENDED MATTER FROM GASES.

1,420,986.  Specification of Letters Patent.  Patented June 27, 1922.

Application filed August 29, 1919. Serial No. 320,587.

*To all whom it may concern:*

Be it known that I, JAMES P. FISHER, residing at Bartlesville, in the county of Washington, State of Oklahoma, have invented certain new and useful Improvements in Apparatus for Removing Suspended Matter from Gases; and I do hereby declare the following to be a full, clear, and exact description of the invention, such as will enable others skilled in the art to which it appertains to make and use the same.

This invention relates to an apparatus for removing suspended matter from gases.

In many industries large quantities of gases are produced which contain minute suspended particles of liquid or solids in the form of a mist or smoke. It is often necessary to separate the suspended particles from the gases, either because of the value of the suspended particles or because of their injurious effect in the gas. This separation is comparatively simple when the particles are large and dense, as it will then suffice to bring the gas to a comparatively quiet state and allow the particles to settle out. When, however, the particles are so light or so small that they settle very slowly and form a comparatively stable suspension in the gas, the suspended material cannot practically be separated from the gas merely by a settling operation.

For the separation of these more or less permanent suspensions, various forms of mechanical separators have been devised in which the gas to be treated is passed through a number of tortuous passages or baffles, or through a filtering medium. In all such apparatus in which an efficient separation of the suspended material from the gas is obtained, a high resistance is offered to the flow of gas, thereby necessitating the use of blowers or gas forcing devices. Moreover, such apparatus is not well suited to the treatment of materials which form a light, porous, or fluffy deposit and which would, therefore, soon fill and clog the separating apparatus unless continuously removed as fast as it is formed.

The primary object of the present invention is to provide an efficient apparatus of simple construction for separating suspended matters from gases without increasing the resistance offered to the flow of the gas.

A further object of the invention is to provide an apparatus for separating suspended matters from gas, in which the separated material is continuously removed from the apparatus.

The various features of the invention are shown in the accompanying drawings, in which:

Fig. 1 is a front elevation with parts in section, taken on the line 1—1 of Fig. 2, of a separating device, embodying the preferred form of the invention; and Fig. 2 is a vertical sectional view of the separating apparatus, taken on line 2—2 of Fig. 1.

To separate suspended matter from gas with the apparatus of the present invention, the gas enters one end of a cylindrical separating chamber where it is caught by rotating blades of a centrifugal fan and thrown by centrifugal force to the walls of the chamber. The momentum of the suspended particles carries them against the wall of the chamber on which they are deposited while the gas is deflected along the surface of the wall to the opposite end of the chamber. To prevent gas carrying suspended material from leaving the chamber, the outgoing gases are passed through a small centrifugal fan placed in the outlet of the chamber. This second centrifugal fan throws the suspended particles and heavier portions of the gas to the inner walls of the chamber and permits only the light purified gas to leave the chamber at the center of the fan. The material deposited on the wall of the separating chamber is continuously removed by rotating scrapers which scrape the cylindrical walls of the chamber and carry the deposited material into a collecting hopper.

Referring more particularly to the drawings, the gas to be treated enters one end of a cylindrical chamber 10 through an inlet 12. As the gas enters the inlet 12, it is caught in the blades of a rapidly moving centrifugal fan 14 mounted adjacent the inlet on a rotating shaft 16 which passes through the chamber 10. The inner end of the shaft 16 is journaled in a bearing 18 secured to the inner walls of the chamber, and the outer end of the shaft extends through a bearing 20 secured in an outlet 22 for the purified gas. A pulley 24 is fixed on the outer end of the shaft which may be driven at a high rate of speed by means of a belt 25. The rotation of the fan 14 throws the gases and suspended particles centrifugally outwardly along the inlet end wall of the chamber 10 to a cylindrical wall 26 of the chamber. The momentum imparted to the suspended particles by the action of the fan 14 acts to positively deposit them on the wall 26 of the chamber 10. The centrifugal action of the fan 14 tends to create a slight vacuum at the centre of the fan, to continuously draw in additional dust-laden gas through the inlet 12. There will, also, be a tendency for gas from the central part of the chamber 10 to be drawn into the central part of the fan 14 and to be continually circulated in the chamber 10. To prevent this circulation which would reduce the draft through the inlet 12 and tend to stir up the material deposited on the wall 26, a plate 27 is secured to the inner side of the fan 14 opposite from the inlet 12.

The gas passing through the chamber to the outlet 22 may carry a part of its suspended matter. To prevent such suspended material from passing out with the gas, a small centrifugal fan 28 is mounted on the shaft 16 adjacent to the outlet opening 22. The blades of the fan 28 are shorter than those of the fan 14 and, although they oppose, to a certain extent, the passage of gas through the outlet 22, their effect will not be sufficient to equal or overcome the draft produced by the fan 14. The centrifugal action of the fan 28 acts to carry any suspended particles in the outgoing gas outwardly along an end wall 30 of the chamber 10 to be deposited on the collecting wall 26. To force the gas to enter the periphery of the fan 28 a plate 31 is secured to the inner face of the fan opposite from the outlet 22.

If the gas was sharply deflected in its course after passing from the fan 14, irregular and relatively rapid currents would be induced which would tend to cause the gas to take up again the suspended matter which had been thrown from it. In order to prevent the formation of such currents, the fans 14 and 28 are located on the shaft 16 at points remote from each other and with the main body of the separating chamber 10 disposed between them. Consequently, the gas after its issuance from the fan 14 travels for a considerable distance along the walls of the separating chamber and then turns gradually inwards to the periphery of the fan 28. With this construction, not only is the fan 14 caused to operate with the maximum effectiveness, but suspended matter which is not directly separated from the gas by the fan 14 is permitted to settle out of the gas during its passage along the chamber from the fan 14 to the fan 28.

If the deposit of materls on the wall 26 were light and fluffy, it would soon be built up to such a thick layer that it would be swept out of the chamber 10 through the outlet 22. To prevent this action, the deposit of material is continuously removed by means of scrapers 32 carried adjacent the wall 26 on rings or hoops 34. As the scrapers 32 are carried around the wall of the chamber, the material is deposited in a collecting hopper 36 at the bottom of the chamber 10.

The hoops 34 are supported by sets of wheels or rollers 38, 40 and 42 carried in housings 44 on the outside of the wall 26. The set of wheels 38 are interconnected by a shaft 46 which is rotated by a belt driven pulley 48. In treating materials such as carbon black, which has a tendency to adhere to the hoops, a layer of material would soon be built up on the wheels and hoops if permitted to do so, which would wedge between the hoops and wheels and prevent rotation of the scraper. To prevent this building up of material, the wheels 38 are provided with teeth 50 which engage openings or perforations 52 on the hoops 34. As the wheels 38 are rotated, the teeth 50 will project through the openings 52 and remove any material collected on the hoops 34 in the path of the wheels 38, 40, and 42, as it is formed. If desired the wheels 40 and 42 may be provided with teeth similarly to wheels 38.

Any type of centrifugal fan which will throw gas and suspended material to the walls of the chamber may be used. It is preferred, however, to have the blades of the fan curved or bent slightly backwardly from the direction of rotation, so that any particle of suspended material which may impinge on the surface of the blade will be given a resulting movement toward the wall of the container. It will be obvious, however, that other forms of centrifugal fans may be used, and that other details of construction in the apparatus may be varied, without departing from the spirit of the invention.

Although in the preferred form of the invention a large fan is placed at the gas inlet, and a smaller fan is placed at the gas outlet, both fans being driven at the same speed by a common supporting shaft, it is not necessary that this construction be followed in all cases. The fans may be separately mounted and driven at different speeds to develop different centrifugal forces at the inlet and outlet, as best adapted for separating particles from the gases. It is, however, not essential that the fans be made of different sizes. They may be made of the same size and driven at different speeds to obtain different centrifugal forces at the inlet and outlet. It is only necessary for the purpose of creating a draft through the apparatus that the inlet fan exert a greater centrifugal force than the outlet fan.

Having described the preferred form of the invention, what is claimed as new is:

1. Apparatus for separating suspended matter from gases comprising a chamber, a gas inlet at one end of the chamber, a gas outlet at the other end of the chamber, a fan mounted adjacent to said inlet arranged to create centrifugal force for throwing the material from the inlet to the walls of the chamber, a fan mounted adjacent to said outlet arranged to create a centrifugal force of lesser degree than the force of the inlet fan, and means on the outlet fan arranged to cause gases to pass from the chamber directly through the fan into the outlet, said chamber being of a length substantially greater than the combined width of the fans, so as to enable suspended matter to settle out of the gas during its passage from one fan to the other.

2. Apparatus for separating suspended matter from gases comprising a chamber, a gas inlet at one end of the chamber, a gas outlet at the other end of the chamber, fans mounted on said chamber only at the gas inlet and outlet, said fans being arranged to impart a rotary motion to the gas in the chamber, and being separated by a distance substantially greater than the combined widths of the fans, to enable suspended matter to settle out of the gas in its passage from one fan to the other, the fan at the outlet being constructed to generate a centrifugal force of lesser degree than the inlet fan to permit gas to pass to the outlet, and means on the outlet fan to cause gas from the chamber to pass directly through the fan into the outlet.

3. Apparatus for separating suspended matter from gas comprising a chamber, a gas inlet at one end of the chamber, a gas outlet at the other end of the chamber, power driven shaft on the said chamber in alignment with said inlet and outlet, a fan mounted on the said shaft adjacent to the inlet, a plate extending across the blades of the fan opposite from the inlet, a fan mounted on said shaft adjacent to the outlet, a plate extending over the blades of the outlet fan opposite from the outlet, said chamber being of a length substantially greater than the combined widths of the fans so as to enable suspended matter to settle out of gas during its passage from one fan to the other, and means for removing from the walls of said chamber material deposited thereon from the gas.

4. In an apparatus for separating suspended matter from gases, comprising a closed gas tight cylindrical chamber, means for introducing gases to and withdrawing gases from said chamber, and means for throwing suspended matter in said gas to the walls of the chamber, the combination of rotatable hoops in said chamber, scrapers mounted on said hoops adjacent to the inner wall of said chamber, wheels supporting said hoops and scrapers, means for driving said wheels to rotate said scrapers, and means for withdrawing from the chamber material collected by the scrapers.

5. In an apparatus for separating suspended matter from gases, comprising a gas tight cylindrical chamber, means for admitting and withdrawing gases from said chamber, and means for throwing suspended matter in said gases to the walls of the chamber, the combination of rotatable perforated hoops in said chamber, scrapers mounted on said hoops, wheels supporting said hoops and scrapers, teeth on some of said wheels engaging the perforations in said hoops, means for driving said toothed wheels, and a hopper for collecting the suspended matter scraped from said chamber walls.

6. In an apparatus for separating suspended matter from gases, comprising a gas tight horizontal cylindrical chamber, means for admitting gases to and withdrawing gases from said chamber and means for throwing suspended matter in said gases to the walls of the chamber, the combination of rotatable hoops in said chambers, scrapers mounted on said hoops, wheels supporting said hoops and scrapers, and a hopper in the lower part of said chamber for collecting the separated material.

7. In an apparatus for separating suspended matter from gases, comprising a cylindrical chamber, means for admitting gases to one end of said cylindrical chamber, means for withdrawing gases from the opposite end of said cylindrical chamber, means for depositing the suspended matter in said gases on the walls of said chamber, the combination of hoops disposed adjacent to the inner walls of said cylindrical chamber, scrapers mounted on said hoops and extending from one end of said cylindrical chamber to the other, and wheels mounted in the walls of said chamber and supporting said hoops.

8. In an apparatus for separating suspended matter from gases, comprising a gas tight cylindrical chamber, means for admitting gas to one end of said chamber, means for withdrawing gas from the opposite end of said chamber, and means for depositing the suspended matter from said gas on the cylindrical walls of said chamber, the combination of perforated hoops disposed adjacent to the inner walls of said chamber, scrapers mounted on said hoops and extending from one end of said chamber to the other, wheels mounted in the walls of said chamber and supporting said hoops, teeth on some of said wheels engaging said perforations, and means for driving said toothed wheels.

9. In an apparatus for separating suspended matter from gases, comprising a gas tight cylindrical chamber, means for admitting gas to one end of said chamber, means for withdrawing gas from the opposite end of said chamber, means for depositing the suspended matter from said gas on the cylindrical walls of said chamber and a collecting hopper on the under side of said chamber, the combination of perforated hoops disposed adjacent to the inner walls of said chamber, scrapers mounted on said hoops and extending from one end of said chamber to the other, wheels mounted in the walls of said chamber and supporting said hoops, teeth on some of said wheels engaging said perforations, and means for driving said toothed wheels.

10. Apparatus for separating suspended matter from gases, comprising a chamber, a gas inlet for said chamber, a gas outlet for said chamber, a rotatable shaft in said chamber, a centrifugal fan mounted on said shaft adjacent to said inlet, a smaller centrifugal fan mounted on said shaft adjacent to said outlet, perforated hoops in said chamber, scrapers mounted on said hoops adjacent said walls of said chamber, and power driven rollers supporting said hoops and scrapers.

11. Apparatus for separating suspended matter from gases, comprising a cylindrical chamber, a gas inlet at one end of said chamber, a gas outlet at the opposite end of said chamber, a rotatable shaft extending through said chamber, a centrifugal fan mounted on said shaft adjacent said inlet, a smaller centrifugal fan mounted on said shaft adjacent said outlet, perforated hoops in said chamber, scrapers mounted on said hoops adjacent the walls of said chamber, wheels supporting said hoops and scrapers, means for driving some of said wheels, and teeth on said driven wheels engaging openings in said hoops.

12. Apparatus for separating suspended matter from gases, comprising a horizontal cylindrical chamber, a gas inlet at one end of said chamber, a gas outlet at the opposite end of said chamber, a rotatable shaft extending through said chamber, a centrifugal fan mounted on said shaft adjacent said inlet, a smaller centrifugal fan mounted on said shaft adjacent said outlet, perforated hoops in said chamber, scrapers mounted on said hoops adjacent the walls of said chamber, a collecting hopper in the lower part of said chamber, wheels supporting said hoops and scrapers, means for driving some of said wheels, and teeth on said driven wheels engaging the openings in said hoops.

13. Apparatus for separating suspended matter from gases, comprising a chamber, a gas inlet and a gas outlet for said chamber, a power driven shaft mounted in said chamber in alignment with said inlet and outlet, a centrifugal fan mounted on said shaft adjacent to said inlet, a plate disposed over the inner side of said fan, a second fan of smaller diameter than said first mentioned fan mounted on said shaft adjacent to said outlet, and a plate mounted over the inner side of said smaller fan, said last-mentioned fan being mounted on the shaft at a point remote from the first-mentioned fan so as to permit suspended material to settle out of the gas during its passage between the fans.

In testimony whereof I affix my signature.

JAMES P. FISHER.